United States Patent [19]
Farrell

[11] 3,850,560
[45] Nov. 26, 1974

[54] MOLD OPENING CONTROL

[75] Inventor: John J. Farrell, Green Brook, N.J.

[73] Assignee: Farrell Patent Company, Dunellen, N.J.

[22] Filed: Aug. 27, 1973

[21] Appl. No.: 391,764

[52] U.S. Cl......... 425/150, 425/168, 425/DIG. 205, 425/DIG. 209, 425/DIG. 231
[51] Int. Cl............................................. B29d 23/03
[58] Field of Search.......... 425/DIG. 209, DIG. 205, 425/DIG. 231, 150, 324 B, 326 B, 242 B, 135, DIG. 203, DIG. 213, 168, 249

[56] References Cited
UNITED STATES PATENTS

| 3,100,913 | 8/1963 | De Matteo | 425/DIG. 209 |
|---|---|---|---|
| 3,632,267 | 1/1972 | Kader | 425/387 B X |
| 3,690,799 | 9/1972 | Johnson | 425/249 X |
| 3,694,121 | 9/1972 | Johnson | 425/249 X |
| 3,697,210 | 10/1972 | Johnson | 425/242 B X |
| 3,761,219 | 9/1973 | Flynn et al. | 425/DIG. 209 |

Primary Examiner—Robert D. Baldwin
Assistant Examiner—David B. Smith
Attorney, Agent, or Firm—Sandoe, Hopgood & Calimafde

[57] ABSTRACT

This molding machine has a motor that raises and lowers a core rod indexing head by a distance equal to a portion of the distance moved by the mold half that opens and closes the mold, preferably one-half as much. The control of working fluid to the head-raising motor depends upon the distance moved by the mold operating motor. The exhaust working fluid from one side of the mold operating motor can be used as the working fluid for the head raising motor.

8 Claims, 4 Drawing Figures

PATENTED NOV 26 1974 3,850,560

MOLD OPENING CONTROL

BACKGROUND AND SUMMARY OF THE INVENTION

In molding machines that have different operating stations arranged around a center, an indexing head is used to support core rods at the different operating stations. When the molds open to release the core rods, it is common practice to have one mold half stationary and the other mold half rise to open the mold. In order to permit the core rods to rotate with the indexing head to move from one station to the next, it is necessary for the core rods to rise enough to clear the cavities of the mold half which is stationary. It is common practice to have the core rods move upward onehalf as much as the movable part as the mold has moved. Different kinds of linkage have been used for accomplishing this purpose. It is an object of this invention to eliminate the necessity of a mechanical linkage for raising and lowering the indexing head, and to provide the indexing head with its own motor which is controlled by the movement of the mold half which is raised and lowered to open and close the mold.

This invention provides for control of the head-raising motor in several different ways. The exhaust working fluid from the mold-operating motor can be supplied to the head-raising motor so that the head-raising motor will operate automatically when the mold-opening motor starts its movement in a direction to open the mold. The stroke of the head-raising motor can be adjusted by means of a stop and a pressure release valve can be provided to permit escape of exhaust fluid from the mold-operating motor which is in excess of that required for the head-raising motor.

In a modified construction of this invention, the head-raising motor and the mold-operating motor can be constructed with equal displacement; but by making the diameter of the head-raising motor twice as great as that of the moldoperating motor, the working fluid from the exhaust stroke of the mold-operating motor will operate the head-raising motor through a distance one-half as much as the distance moved by the mold-operating motor.

Another modification of the invention utilizes a servo-motor which is moved by the mold-operating motor or some portion of the mold-operating mechanism controlled by the motor; and this servo-motor controls the supply of working fluid to the head-raising motor.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
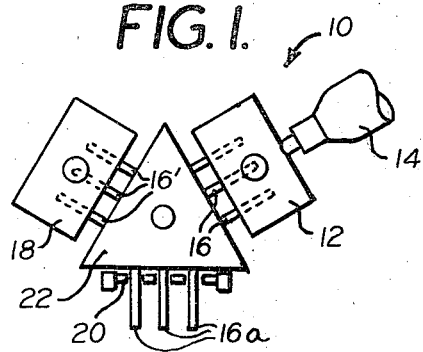
FIG. 1 is a diagrammatic view showing a molding machine with an indexing head for moving core rods from one operating station to another.

FIG. 1 shows a molding machine 10 with three operating stations. These stations are located at 120° angular relation to one another. The first station includes an injection mold 12 to which hot plastic is supplied from an injection device 14. Core rods 16 extend into the cavities of the injection mold 12 and receive parisons of molten plastic when the injection device 14 supplies the plastic to the closed mold.

There is a mold 18 at the blowing station of the machine 10 and core rods 16' extend into the cavities of the blowing mold 18. The third operating station of the molding machine 10 includes a stripper 20 which moves lengthwise of other core rods 16a to push blown molded articles from the core rods to a receptacle holder into which the finished articles are discharged.

After each operation of the molding machine, the molds 16 and 18 open and the core rods are raised by an indexing head 22 from which they are supported. The indexing head 22 then rotates through 120° and carries each set of core rods to the next operating station. This is conventional operating mechanism for injection blow molding machines and when the molds open, they open wide enough so that raising of the indexing head 22 by a distance half as much as the opening of the molds will raise the core rods 16 high enough to clear the stationary portions of the molds which do not move when the molds open.

Figure 2:
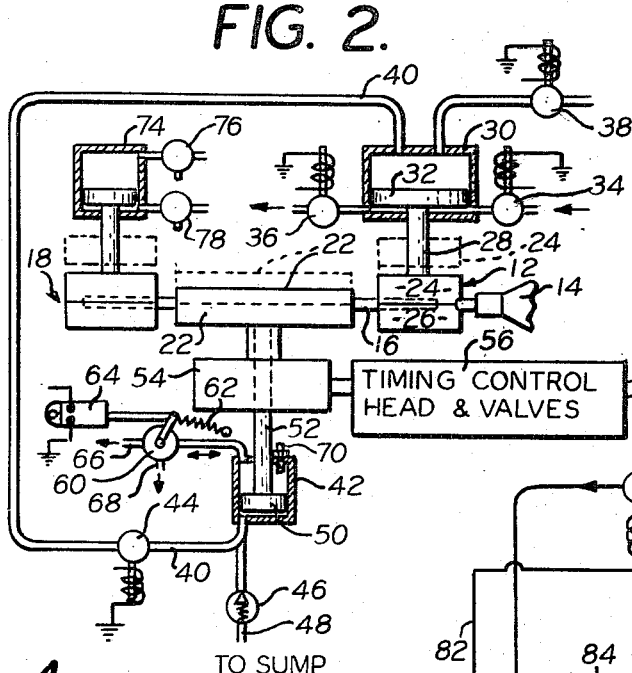
FIG. 2 is a diagrammatic view showing a head-raising motor operated by exhaust fluid from a mold-operating motor.

FIG. 2 shows the apparatus of FIG. 1 diagramatically with the injection mold 12 formed with two parts including an upper part 24 that moves toward and from a fixed lower part 26. The upper part 24 is connected to a ram 28 which is shown as the piston rod of a cylinder and piston motor 30. When the motor piston 32 moves to the top of its stroke, the upper part 24 of the mold 12 moves into the dotted line position shown.

Working fluid is supplied to the lower end of the motor 30 under the control of a solenoid operated valve 34; and the exhaust of working fluid from the lower end of the motor 30 is controlled by another solenoid operated valve 36.

Working fluid is supplied to the upper end of the cylinder of the motor 30 through a solenoid operated intake valve 38 and the exhaust working fluid from the motor 30 discharges through tubing 40 which leads to another motor 42 with a solenoid operated valve 44 located in the tubing line 40. When pressure in the tubing 40 exceeds a predetermined value, the working fluid supplied to the motor 42 can escape through a pressure release valve 46 and tubing 48 leading to a sump of the system.

The motor 42 has a piston 50 and a piston rod 52 which extends upward through an indexing unit 54 and which supports the indexing head 22.

The indexing unit 54 rotates the indexing head 22 periodically in accordance with the operation of a timing control 56 for the indexing head and valves. Such apparatus for rotating an indexing head is well-known in the molding machine art and no further illustration of it is necessary for a complete understanding of this invention. Such apparatus is always constructed so that the indexing head can be raised and lowered without interfering with the indexing operation; but the raising and lowering of the head is ordinarily accomplished by mechanical linkage connected with the top of the head for pulling it up when the mold opens. This invention substitutes the motor 42 located under the indexing head with the piston rod 52 for pushing the head upward when necessary and lowering it when the molds are closing.

The flow of working fluid to the upper end of the motor 42 is controlled by a three-way valve 60 which is moved in one direction by a spring 62 and in the other direction by a solenoid 64. When the valve 60 is in one position, working fluid under pressure is supplied to motor 42 through a fluid supply line 66; and when the valve 60 is in another position working fluid exhausts from the motor 42 through an exhaust line 68 which lead to the sump of the hydraulic system.

The stroke of the motor 42 is adjustable. In the construction illustrated, there is a stop 70 comprising a screw which threads through the upper head of the cylinder 42 and which is in a position to be struck by the piston 50 as the piston rises in the cylinder. As soon as the piston 50 contacts with the stop 70, and can move no further, pressure builds up in the cylinder 42 and escapes through the pressure relief valve 46.

Whenever the valve 34 opens and starts the motor 30 on its stroke to open the mold 12, working fluid above the piston 32 is displaced through the exhaust tubing 40. The solenoid operated valve 44 is opened at the same time that the valve 34 opens and the exhaust fluid can, therefore, flow directly from the motor 30 to the other motor 42. The motor 42 lifts the indexing head and the core rods 16. The core rods cannot rise any faster than the upper half 24 of the mold 12 or that of the mold 18 and any excess working fluid above that required to lift the indexing head will raise the pressure in the motor 42 and exhaust through the pressure relief valve 46.

As soon as the indexing head 22 and core rod 16 have moved upward approximately one-half as much as the opening movement of the molds, and at least far enough to clear the lower portions of the molds, the piston 50 of motor 42 contacts with the stop 70 and this prevents further upward movement of the indexing head and core rods. The opening movement of the molds continues so that the molds open wide enough for the core rods to clear the movable portions of the molds; and then the indexing head 22 is rotated through its angular movement to bring each set of core rods to the next operating station, as has been already explained in connection with FIG. 1.

When the indexing movement of the head 22 stops, the valve 34 closes and the exhaust valve 36 for the motor 30 opens. The supply valve 38 for the upper end of the motor 30 opens and the valve 44 in the exhaust tubing 40 closes. As working fluid enters the motor 30 through the valve 38, the piston 32 moves downward. This moves the mold part 24 back to closed position. At the same time that the molds are closing, the solenoid 64 is operated to supply working fluid to the upper end of the indexing head motor 42 and the piston 50 moves downward and causes the working fluid beneath it to exhaust through the relief valve 46. The rate at which the motor 42 lowers the indexing head 22 and core rods 16 can be controlled by the size of the pipes or tubes used for the valve 60 or by orifices in the valve if needed.

The blowing mold 18 is opened and closed by a motor 74 supplied with solenoid operated valves 76 and 78 which can be three-way valves similar to the valve 60 though the operating mechanism for the valves 76 and 78 is not shown since it would be merely repetitious. It would be understood, of course, that these valves 76 and 78 are operated in unison with the valves for the motor 30 by the control apparatus 56.

Figure 3:
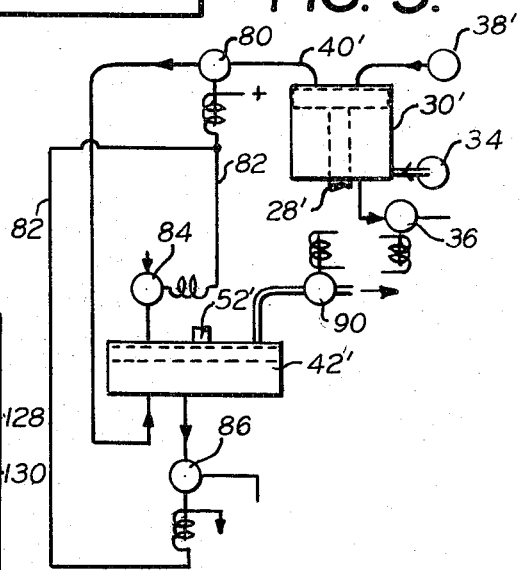
FIG. 3 is a diagrammatic view showing a modification of the structure shown in FIG. 2 in which both the mold-operating motor and the head-raising motor have equal displacement but different bores for controlling the motion of one with respect to the other.

FIG. 3 shows a modification of the construction illustrated in FIG. 2. Parts corresponding to those in FIG. 2 are indicated by the same reference character with a prime appended. The indexing head and the molds are not shown because they are the same as in FIG. 2. The only difference is the use of a motor 42' which is larger than the motor 42 of FIG. 2 in that it has the same displacement as the motor 30' that operates the injection mold. The valves for the motor 30' are the same as in FIG. 2 though some of them are differently located in order to make the drawing more compact. They connect however with the motor 30' in the same way. The valves for the motor 42' are changed somewhat since separate intake in exhaust valves are used for the upper end of the motor 42'.

When the valve 38' is closed and the valve 34' opened to start the movement of the motor 30' in a direction to open the injection mold, a valve 80 in the tubing 40' is opened and the exhaust working fluid from the motor 30' flows into the lower end of the head raising motor 42'. The solenoid operated valve 80 has its operating solenoid connected in a circuit 82 with another solenoid operated valve 84 that controls the exhaust of working fluid from the upper end of the motor 42'. This same electrical circuit 82 also closes an exhaust valve 86 at the lower end of the motor 42'.

The motor 42' has a diameter twice as great as the diameter of the motor 30'. Because of this correlation in the bore of the motors 42' and 30', the movement of the piston of the motor 30' will displace enough working fluid to move the piston in the motor 42' one-half as much; that is, at one-half the speed of the motor 30'. Thus the indexing head and core rods will be raised by the motor 42' at one-half the speed that the mold is opened by the motor 30'.

The motors 30' and 42' complete their strokes at the same time. When the motor 30' is reversed to again close the molds, the exhaust valve 80 closes, the intake valve 84 closes and the exhaust valve 86 opens. Another valve 90 at the upper end of the motor 42' is open only during the head raising stroke of the motor 42' for the exhaust of working fluid from above the piston of the motor 42'.

Figure 4:
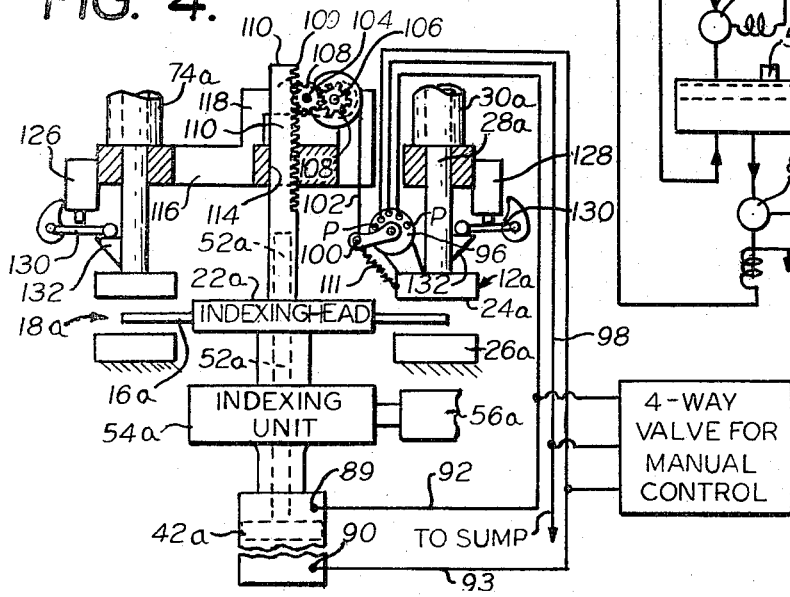
FIG. 4 is a diagrammatic view showing another modification which utilizes a servo-motor to control the head-raising motor.

FIG. 4 shows another modified form of the invention. The parts shown in FIG. 4 which correspond with those of FIG. 2 are indicated by the same reference characters with a letter "a" appended. Some parts are shown on a different scale in order to reduce the size of the drawing. No valves for the motors 30a and 74a are shown in FIG. 4 because the valves for these motors are entirely conventional and operated from the timing mechanism of the molding machine. The control of working fluid to and from the motor 42a is, however, novel in FIG. 4; and another difference in the FIG. 4 construction is the provision of safety limits which are shown diagrammatically and which can be used in the other modifications of the invention if desired.

The motor 42a has a port 89 which serves for both the supply and exhaust of working fluid to the upper end of the motor 42a. There is another port 90 at the lower end of the cylinder 42a which also serves as both a supply and exhaust port. Tubing 92 and 93 connects the ports 89 and 90, respectively, with a valve 96 which serves as a servo-motor in combination with the motor 42a. The valve 96 has five ports. A center port connects with tubing 98 which leads to a sump of the hydraulic system. The ports to the right and left of the center port of valve 96 connect with the tubing 92 and 93, respectively. The other two ports marked with the letter "p" are connected to a source of working fluid pressure.

The valve 96 is operated by a handle 100. When the handle 100 is in a center position, it connects both ports 89 and 90 of the motor 42a with the tubing 58 leading to the sump of the hydraulic piston. If the handle 100 is moved clockwise from this center position, the valve 96 leaves the motor port 90 connected with the sump tubing 98 but supplies pressure from one of the pressure ports to the upper port 89 of the motor 42a so that the motor 42a lowers the indexing head 22a. Conversely, counterclockwise movement of the handle 100 from its neutral position leaves the port 89 of the motor 42a connected with the sump and supplies pressure to the lower port 90 so that the motor 42a raises the indexing head 22a.

The valve 96 is connected by a bracket to the movable part 24a of the injection mold 12a. When the molds are closed and the indexing head 22a is in its lowered position with the core rods 16a extending into the cavities of the closed molds, the valve 96 is in its neutral position.

The handle 100 is connected with the piston rod 52a by motion-transmitting means including a cable 102 secured at its lower end to the handle 100 and passing around a drum 104 at its upper end. This drum 104 is on the same shaft 106 with a pinion 107 that meshes with an idler 108 which in turn meshes with a rack 109 on one side of a sleeve 110 that fits over an upward extension of the piston rod 52a. The sleeve 110 moves up and down as a unit with the piston rod 52a and the indexing head 22a but does not rotate with the indexing head. A spring 111 stretched between the handle 100 and a fixed part of the movable mold section 12a gives the handle 100 a bias to turn in a counterclockwise direction, and keeps the cable 102 tight at all times. The sleeve 110 slides in a bearing 114 in a fixed part 116 of the frame of the molding machine. Bearings for the shaft 106 and idler 108 are in a bracket 118 that is rigidly secured to the fixed frame 116.

When the injection mold 12a starts to close, the movable mold section 24a moves downwardly in FIG. 4. This moves the valve 96 downward while the indexing head 22a remains stationary. Since the pinion 106 and drum 104 cannot rotate while the sleeve 110 is stationary, the pull of the cable 102 causes the handle 100 to move clockwise. This turns the servo valve 96 and causes the motor 42a to move the indexing head 22a downward. As the cable 102 unwinds from the drum 104, the spring 111 moves the valve handle 100 counterclockwise.

Since the indexing head 22a is intended to move only one-half as much as the upper mold section 24a, the effective diameter of the drum 104 and of the pinion 107 are correlated in a ratio of two to one so that the movement of the cable 102 imparts twice as much movement to the handle 100 as the sleeve 110 and indexing head have moved to produce this motion of the cable 102.

If the motor 42a moves the indexing head 22a more than half as fast as the motor 30a moves the upper mold section 24a, then the valve handle 100 has a resulting counterclockwise movement which operates the valve 96 so as to slow down the flow of working fluid to the motor 42a.

This arrangement causes the indexing head to descend and in doing so to move the valve handle 22 so that the valve handle will reach its neutral position when the valve 96 has moved downward to its lowest position; the position that it occupies when the movable mold section 24a has reached closed position.

Likewise, when the injection mold begins to open, by operation of the motor 30a to raise the upper mold section 24a, the upward movement of the valve 96 as a unit with the upper mold section 24a causes the valve handle 100 to move counterclockwise as the result of the pull of the spring 111.

This counterclockwise movement of the handle 100 causes the valve 96 to supply working fluid to the lower end of the motor 42a so that the motor begins the upward movement of the indexing head 22a and sleeve 110.

The upward movement of the sleeve 110 causes the rack 109 to rotate the pinions 108 and 106 so that the drum 24 turns in a counterclockwise direction and reels in some of the length of the cable so as to counteract the upward movement of the valve 96 with the movable mold section 24a.

A manual override 124 comprising a conventional four-way valve is connected with a source of pressure and with the tubings 92, 93 and 98 for operating the machine if and when the valve 96 is not used, as when making repairs or replacements.

Limit switches 126 and 128 are secured to fixed parts of the frame 116, and each of the limit switches has an actuator 130 in the path of travel of the movable mold part, or an element 132 that moves with the movable mold part, for operating the limit switches 126 and/or 128 if the movable mold parts travel beyond a predetermined limit of movement. The switches stop the application of power to the mold-opening motors.

The preferred embodiments of the invention have been illustrated and described. Terms of orientation are, of course, relative; and some features can be used in different combinations without departing from the invention as defined in the claims.

What is claimed is:

1. In a molding machine having multiple stations at which operations are performed successively and a core rod support that moves intermittently to carry core rods to different stations successively, the combination comprising a mold at one of the stations, the mold having two parts one of which moves toward and from the other to close and open the mold, a first motor for moving one part of the mold with respect to the other part, means for moving the core rod support up and down to raise the core rods when the mold opens so that the core rods clear the mold part toward and from which the other mold part moves, the means for moving the core rod support up and down including a second motor, a control valve that regulates the control of working fluid to one of the motors to control the operation of that motor, an element that moves in unison with the movable part of the mold, another element that moves in unison with the indexing head, the control valve being connected with one of said elements for movement as a unit therewith, and an operating part of the control valve connected with the other of said elements, the operating part of the control valve determining the flow of working fluid in accordance with the resultant motion imparted to said control valve by both of said motors.

2. The molding machine described in claim 1 characterized by the control valve having ports, and tubing connecting the ports of the control valve with ports of the motor that is connected with the operating element of the control valve.

3. The molding machine described in claim 1 characterized by the connection between the control valve and one motor being oriented to operate when that one motor moves and to supply working fluid to one end of the other motor so as to cause the other motor to move the control valve in a direction to offset the operation of the control valve by said one motor.

4. The molding machine described in claim 1 characterized by the control valve being connected with the movable part of one of the molds of the molding machine for movement as a unit therewith, the ports of the control valve being connected by tubing with opposite ends of a double acting motor that raises and lowers the core rod support, and the connection of the core rod support motor with the control valve including motion transmitting connections having a mechanical advantage that gains speed whereby the control valve is moved substantially further when the core rod support moves.

5. The molding machine described in claim 1 characterized by the machine having operating stations at angularly spaced locations around a center axis, the core rod support being an indexing head that moves intermittently through successive angular movements to bring the core rods to the different operating stations, a bracket connecting the entire control valve with the movable mold section at one of the stations for movement up and down as a unit with the movable part of the mold, an operating element of the valve extending from the valve in a generally horizontal direction, a connection between the valve operating element and the indexing head by which the indexing head moves one end of the operating element upward when the indexing head moves upward with respect to the movable mold part, and for causing the said one end of the operating element to move downward when the indexing head moves downward with respect to the movable mold part.

6. The molding machine described in claim 5 characterized by the indexing head having approximately one-half the movement of the movable mold part, and the indexing head being connected with the operating element of the control valve by motion transmitting connections that have the control valve end thereof movable up and down at approximately twice the speed of up and down movement of the indexing head and in the same direction as the movement of the indexing head.

7. The molding machine described in claim 6 characterized by the connection of the indexing head to the operating element of the control valve being a flexible element, a circular element on which the flexible element winds, gearing connecting the circular element with the indexing head with a mechanical advantage that moves the flexible element approximately twice as far as the indexing head moves up and down.

8. The molding machine described in claim 5 characterized by the control valve having ports and a valve element that moves into different positions with respect to the ports including one position that supplies working fluid under pressure to one end of the indexing head motor and that connects the other end of the indexing head motor with an exhaust outlet, a second position that supplies working fluid under pressure to said other end of the indexing head motor, and that connects the first end of the indexing head motor with an exhaust outlet, and a third position in which both ends of the indexing head motor are connected with the exhaust outlet, the indexing head motor being a double acting cylinder and piston motor.

* * * * *